United States Patent

Arai

[15] 3,646,869
[45] Mar. 7, 1972

[54] ELECTRONIC SHUTTER FOR PHOTOGRAPHIC CAMERAS

[72] Inventor: Kiyoyuki Arai, Gyoda, Japan
[73] Assignee: Kabushiki Kaisha Koparu
[22] Filed: Feb. 3, 1970
[21] Appl. No.: 8,248

[30] Foreign Application Priority Data

Feb. 10, 1969 Japan............................44/9922
Apr. 30, 1969 Japan............................44/40262

[52] U.S. Cl. .......................................95/53 EB, 95/10 CT
[51] Int. Cl. ..........................................................G03b 9/58
[58] Field of Search..............95/53, 53 E, 53 EA, 53 EB, 95/58, 59, 62, 63

[56] References Cited

FOREIGN PATENTS OR APPLICATIONS 1,254,011  11/1967  Germany..............................95/53 E
1,239,564  4/1967  Germany..............................95/53 E
1,233,714  2/1967  Germany..............................53 E/

Primary Examiner—Joseph F. Peters, Jr.
Assistant Examiner—Monroe H. Hayes
Attorney—Otto John Munz

[57] ABSTRACT

A shuttering opening control lever has a permanent magnet which is attracted to an electromagnet when the electromagnet is deenergized. A shutter closing control member is attracted to the electromagnet when the electromagnet is energized, and the repelling force between the electromagnet and the permanent magnet actuates the shutter opening control lever to effect opening of the shutter. Upon deenergization of the electromagnet the shutter closing control lever, which has until then been attracted to the electromagnet, moves away from the latter and effects closing of the shutter.

8 Claims, 4 Drawing Figures

INVENTOR
KIYOYUKI ARAI

INVENTOR
KIYOYUKI ARAI

ELECTRONIC SHUTTER FOR PHOTOGRAPHIC CAMERAS

BACKGROUND OF THE INVENTION a. Field of the Invention

The present invention is concerned with an electronic shutter for photographic cameras, which is adapted to be controlled of the exposure time by an electronic circuit.

b. Description of the Prior Art

Electronic shutters in general are designed in such a way that an electromagnet is connected to the output terminal of an electronic circuit and that the actions of the mechanical members of the shutter are controlled by this electromagnet. There is, however, a certain interval of time from the time at which a signal is generated in this electronic circuit until the time at which the mechanical members of the shutter (such as the shutter blades) are actuated in effect. Accordingly, for the purpose of bringing the time which is controlled by the electronic circuit into agreement with the exposure time which is controlled by the actions of the mechanical members, it is desirable that both the shutter opening action and the shutter closing action be performed by utilizing the signal delivered from a single electronic circuit.

As a means to accomplish this purpose, there is a known arrangement which has two electromagnets connected to the output terminal of an electronic circuit so as to be operative in such a way that an opening action is imparted to the shutter by one of the electromagnets and that a closing action is imparted to the shutter by the other of the electromagnets. Such an arrangement, however, is quite disadvantageous from the viewpoint of space because of the fact that the electromagnets are such members that are relatively large in size. Especially, in case it is intended to arrange the electromagnets within the shutter casing, a great difficulty will be encountered in designing. Also, electromagnets are relatively expensive, and therefore, the use of two electromagnets is economically disadvantageous.

In order to solve the foregoing disadvantages and inconveniences of the prior art, there has been proposed an arrangement capable of making the mechanical members of the shutter perform both the shutter opening action and the shutter closing action by the use of a single electromagnet (U.S. Pat. application Ser. No. 812,092 filed on Apr. 1, 1969). This proposed shutter mechanism comprises a permanent magnet attached to the member adapted to directly move the shutter blades so that, when the electromagnet is energized, there is produced a repelling force between the electromagnet and the permanent magnet so that only this repelling force is utilized to move the aforesaid member and, accordingly, to move the shutter blades. However, the arrangement designed to move the shutter blades by relying on the magnetic repelling action alone has a drawback in that the action of the shutter blades could be unstable. In addition, to move such members as the shutter blades which produce a considerable amount of friction between the respective blades during their movement, there is required a considerably great amount of force, and this will, after all, lead to the necessity of using an electromagnet of a large size. Accordingly, such an arrangement is disadvantageous also from the aspect of consumption of electric power.

SUMMARY OF THE INVENTION

It is, therefore, an object of the present invention to provide an electronic shutter equipped with an electromagnet adapted to be controlled of the actuation time by an electronic circuit so as to be operative in such a way that, when this electromagnet is energized, the opening action of the shutter is started by virtue of the signal delivered from the electromagnet and that, when the electromagnet is deenergized, the closing action of the shutter is started by virtue of the signal delivered therefrom. By this arrangement, there is obtained a precise and exact time of exposure and furthermore, the employment of a single electromagnet provides an advantage in term of not only space but also cost as well.

Another object of the present invention is to provide an electronic shutter comprising: operating means for making the shutter to effect the opening action, first control means equipped with a permanent magnet and capable of locking said operating means to the cocked position, and second control means adapted to be attracted to said electromagnet while the latter is energized, whereby said shutter is operative in such a way that, when said electromagnet is energized by the electronic circuit, the first control means is actuated by the repelling force produced between said permanent magnet and said electromagnet to release said operating means and that, when the electromagnet is deenergized, said second control means is repelled away from said electromagnet, thereby permitting the closing action of the shutter to take place. According to this arrangement, there is obtained a stable action of the shutter, and also, the use of an electromagnet of a compact size becomes possible and, accordingly, the electric power to be consumed can be minimized.

DESCRIPTION OF THE PREFERRED EMBODIMENTS

Figure 1:
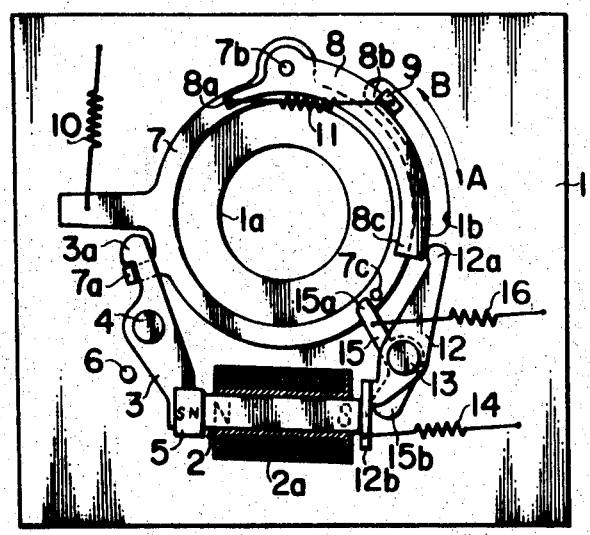
FIGS. 1, 3 and 4 are somewhat diagrammatic explanatory representations, showing different embodiments in their cocked state.

First, description will be made of the first embodiment by referring to FIGS. 1 and 2. FIG. 1 shows the shutter in its cocked state. In FIG. 1, reference number 1 represents a baseplate having an exposure aperture 1a and an arcuate slot 1b. An electromagnet 2 is fixed to the baseplate 1. When an electric current is supplied in a coil 2a, there is generated the polarity relation as indicated by the dotted letters in the drawing. A shutter opening control lever 3 having a hook portion 3a at one end is rotatably mounted on a shaft 4. A permanent magnet 5 is attached to the other end of the shutter opening control lever 3 in such a way that the magnetic poles are positioned as indicated by the real letters in the drawing. During the period in which the electromagnet 2 is not energized, the permanent magnet 5 is kept to be attracted to the electromagnet 2 by virtue of the magnetic force of the permanent magnet 5 and, accordingly, the shutter opening control lever 3 is in the position as seen in FIG. 1. When the electromagnet 2 is energized in this state, there is generated a repelling force between the electromagnet 2 and the permanent magnet 5. Owing to this repelling force, the shutter opening control lever 3 is rotated clockwise until its movement is arrested by a stopper 6. In this instance, the shutter opening control lever 3 may be equipped with a weak spring which urges said shutter opening control lever 3 to rotate counterclockwise. It should be noted, however, that this force of said spring has to be smaller than the repelling force which is generated between the electromagnet 2 and the permanent magnet 5 when said electromagnet 2 is energized.

An operating ring 7 is rotatably arranged about the exposure aperture 1a, and this ring 7 is of a bent portion 7a which is adapted to engage the hook portion 3a of the shutter opening control lever 3. An operating lever 8 is provided with a bent portion 8a, a stepped portion 8b and an arm portion 8c. This operating lever 8 is rotatably mounted on a shaft 7b which, in turn, is fixed to the operating ring 7. Reference numeral 9 represents a bent portion of a known sector ring (not shown), which is rotatably arranged about the exposure aperture 1a. This bent portion 9 passes through the slot 1b of the baseplate 1 and extends at substantially right angle at the site thereof where this bent portion 9 has passed beyond said slot 1b. In FIG. 1, this bent portion 9 engages the stepped portion 8b of the operating lever 8. The shutter blades (not shown) are, therefore, adapted to open as the sector ring is rotated clockwise, or in other words, when said bent portion 9 moves toward the arrow A within the slot 1b, and, on the other hand, the shutter blades are adapted to close as said bent portion 9 returns toward the arrow B. Accordingly, in the state of the shutter shown in FIG. 1, the shutter blades (not shown) remain to be in the state of covering the exposure aperture 1a.

A spring 10 is provided between the operating ring 7 and the baseplate 1. A spring 11 is provided between the bent portion 8a of the operating lever 8 and the bent portion 9 of the sector ring. A shutter closing control lever 12 having an end portion 12a and a bent portion 12b is rotatably mounted on a shaft 13. A spring 14 is provided between the shutter closing control lever 12 and the baseplate 1 to urge said shutter closing control lever 12 to rotate counterclockwise. A holding lever 15 having end portions 15a and 15b is rotatably mounted on the shaft 13. A spring 16 is provided between said holding lever 15 and the baseplate 1 so as to urge the holding lever 15 to rotate clockwise. Since the spring 16 is of a force greater than the force of the spring 14, it will be understood that, when the shutter is in its cocked state, the end portion 12b of the shutter closing control lever 12 is urged, as shown in FIG. 1, to be pressed against the electromagnet 2 by the end portion 15b of the holding lever 15. This urging force exerted by the spring 16 is removed when a pin 7c which is provided on the operating ring 7 pushes the end portion 15a of the holding lever 15 as a result of the clockwise rotation of the operating ring 7 which is effected by the action of the spring 10.

Figure 2:
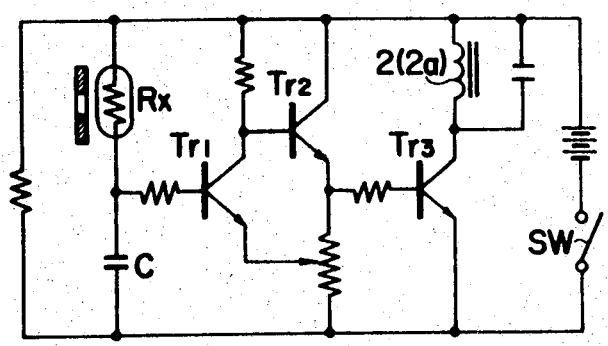
FIG. 2 is a somewhat diagrammatic representation, showing an example of the electronic circuit which can be applied to the present invention.

FIG. 2 shows an electronic circuit for controlling the energizing time to the electromagnet 2. This circuit is operative in such a way that, when the switch SW is closed, the transistor $Tr_1$ is rendered to the "cutoff" state, while rendering the transistors $Tr_2$ and $Tr_3$ to the "on" state, whereby the electric current flow through the coil 2a of the electromagnet 2. Subsequently, a capacitor C is charged through a photoconductive element Rx. When the base potential of the transistor $Tr_1$ becomes higher than the emitter potential thereof, the transistor $Tr_1$ is rendered to the "on" state. As a result, the transistors $Tr_2$ and $Tr_3$ are both rendered to the "cutoff" state, so that the supply of the electric current to the coil 2a is interrupted, and thus the electromagnet 2 is deenergized.

It should be understood that, in the aforesaid electronic circuit, a variable resistor may be connected in the circuit in place of the photoconductive element Rx which is adapted to be exposed to the light rays coming from the subject to be photographed, so that the time for the electric current to flow in the coil 2a may be controlled as desired. It should be noted that the electronic circuit used in this embodiment is a CR delay circuit. It should be understood, however, that the electronic circuit which is applicable to the present invention is not limited particularly to this CR delay circuit alone, but any other circuits may be employed provided that they are capable of controlling the supply time of the electric current to the coil 2a.

Description will hereunder be directed to the function of the embodiment shown in FIG. 1. The release button (not shown) of the camera may be depressed. Whereupon, the switch SW of the electronic circuit will close, interlockingly with said depression of the button, causing an electric current to flow through the coil 2a. As a result, the electromagnet 2 is energized, generating a repelling force between the permanent magnet 5 and the electromagnet 2. Owing to the repelling force thus produced, the shutter opening control lever 3 is rotated clockwise, relieving the engagement between the hook portion 3a of the shutter opening control lever 3 and the bent portion 7a of the operating ring 7. While the operating ring 7 is rotated clockwise by the action of the spring 10, the bent portion 9 of the sector ring, during which time, is moved toward the arrow A through the operating lever 8. As a consequence, the shutter blades (not shown) which have till then been covering the exposure aperture 1a are caused to open. As the operating ring 7 is rotated clockwise, the pin 7c will push the end portion 15a of the holding lever 15 to rotate the latter counterclockwise against the force of the spring 16. However, the shutter closing control lever 12 remains stationary because the bent portion 12b thereof is still in the state of being attracted to the electromagnet 2.

When the electromagnet 2 is deenergized by the electronic circuit after a lapse of time which is controlled by the electronic circuit, the shutter closing control lever 12 is thereby rotated counterclockwise by the action of the spring 14. During this operation, the end portion 12a of said lever 12 pushes the arm 8c of the operating lever 8, so that this lever 8 is rotated clockwise, causing its stepped portion 8b to be disengaged from the bent portion 9 of the sector ring. As a result, the bent portion 9 is moved toward the arrow B by the force of the spring 11, and the shutter blades are thus closed.

When it is intended to cock the shutter, it is only necessary to rotate counterclockwise, against the force of the spring 10, the operating ring 7 continuously until the latter assumes the position shown in FIG. 1.

The embodiment shown in FIG. 1 is operative so that each exposure is performed by the one reciprocal movement of the shutter blades. Description will hereunder be made on an arrangement of the second embodiment shown in FIG. 3 in which the shutter is of the type provided with two groups of shutter blades (or two groups of curtains) and is operative so that, by actuating these two groups in unidirection one after another, a single exposure is performed.

Figure 3:
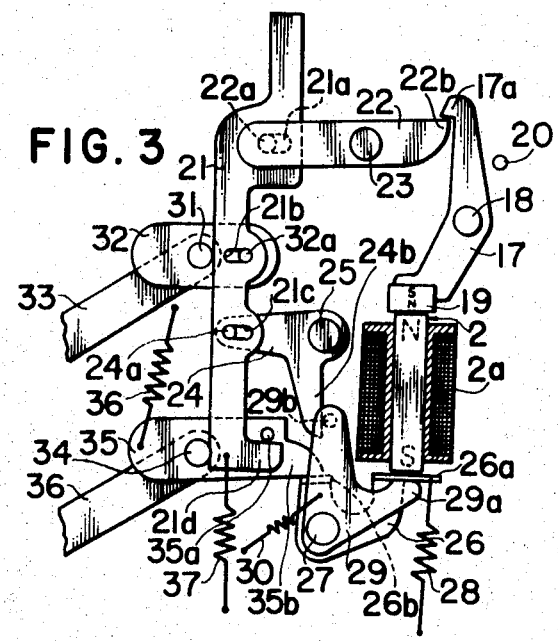

In FIG. 3, the baseplate 1 is omitted for the sake of simplicity of explanation. The electromagnet 2 employed in this embodiment is of the type identical with that shown in connection with the first embodiment. A shutter opening control lever 17 is of a hook portion 17a and this lever 17 is rotatably mounted on a shaft 18. A permanent magnet 19 is fixed to the shutter opening control lever 17. By referring to FIG. 3 which shows the shutter in its cocked state, it will be noted that this lever 17 is attracted, at its permanent magnet 19, to the electromagnet 2 by virtue of the magnetic force of said permanent magnet 19. The distance of the clockwise rotation of the shutter opening control lever 17 is limited by a stopper 20. An operating plate 21 is provided with slots 21a, 21b and 21c and a projection 21d. A lever 22 provided with a pin 22a and an end portion 22b is rotatably mounted on a shaft 23. The lever 22 is united to the operating plate 21 as a result of the engagement of the pin 22a with the slot 21a within said slot. A lever 24 which is provided with a pin 24a and an end portion 24b is rotatably mounted on a shaft 25. This lever 24 is united to the operating plate 21 through the engagement of a pin 24a thereof with the slot 21c within the latter slot. A shutter closing control lever 26 which is provided with bent portions 26a and 26b is rotatably mounted on a shaft 27. A spring is provided so as to urge the shutter closing control lever 26 to rotate clockwise. A holding lever 29 which is provided with an end portion 29a and a pin 29b is rotatably mounted on a shaft 27. The end portion 29a of the holding lever 29 is seen to be in contact with the bent portion 26a of the shutter closing control lever 26, while on the other hand, the pin 29b of the holding lever 29 is noted to be in contact with the end portion 24b of the lever 24. A spring 30 is provided so as to urge the holding lever 29 to rotate counterclockwise, and this spring 30 has a spring force greater than that afforded by the spring 28.

A shaft 31 is rotatably provided on the baseplate (not shown). A lever 32 is attached to said shaft 31 integrally therewith. This lever 32 is united to the operating plate 21 by a pin 32a. A lever 33 for driving the first shutter (or curtain) is attached to the shaft 31 integrally therewith. By virtue of the clockwise rotation of said shaft 31, the first shutter is moved away from its position in which it has been covering the exposure aperture. A shaft 34, like the shaft 31, is rotatably attached to the baseplate (not shown). A lever 35 is rotatably mounted on the shaft 34 integrally therewith and is provided with a pin 35a which is adapted to contact the projection 21d of the operating plate 21 and is also provided with an end portion 35b which is adapted to engage the bent portion 26b of the shutter closing control lever 26. A lever for driving the second shutter (or curtain) is attached to the shaft 34 integrally therewith and is capable of moving the second shutter to the position in which the second shutter will cover the exposure aperture. A spring 36 is provided so as to urge the lever 35 to rotate clockwise. A spring 37 is provided so as to move the operating plate 21 to move downwardly.

Description will hereunder be directed to the function of the second embodiment shown in FIG. 3. FIG. 3 shows the shutter in its cocked state. When the electromagnet 2 is energized while the shutter is held in the aforesaid state, there is generated a repelling force between the electromagnet 2 and the permanent magnet 19. This repelling force will work so that the shutter opening control lever 17 is rotated clockwise. As a result, the hook portion 17a of said lever is relieved from its engagement with the lever 22. As a consequence, the operating plate 21 is forced to make a downward movement by the action of the spring 37. Along with this operation, the shaft 31 is rotated clockwise, and therefore, the first shutter is caused to retreat backward from its position in which it has been covering the exposure aperture. In accordance with the downward movement of the operating plate 21, the lever 24 is caused to rotate counterclockwise. As a consequence, the end portion 24b of said lever 24 will push the pin 29b of the holding lever 29 so that the latter lever is forced to rotate clockwise against the action of the spring 30. Since, at that time, the bent portion 26a of the shutter closing control lever 26, remains to be in the state of being attracted to the electromagnet 2, the shutter closing control lever 26 is not urged to rotate by the spring 28.

When, subsequently, the electromagnet 2 is deenergized by the electronic circuit after a lapse of time which is controlled by the electronic circuit, the shutter closing control lever 26 is urged to rotate clockwise by the spring 28. As a consequence, the end portion 35b of the lever 35 is relieved from its engagement with the bent portion 26b of the shutter closing control lever 26. As a result, the shaft 34 is urged, by the action of the spring 36, to rotate clockwise, so that the second shutter is moved, accordingly, up to the position in which the shutter will cover the exposure aperture.

The cocking of the shutter is effected simply by merely moving the operating plate 21 upwardly against the force of the spring 37 up to the position shown in FIG. 3.

Next, description will be made on the third embodiment shown in FIG. 4. In this drawing, the baseplate is omitted for the sake of simplicity of explanation. This third embodiment is of the type that a group of shutter blades is adapted to make reciprocal movement to perform a single exposure. Therefore, the arrangement as a whole of this embodiment has a close resemblance to the first embodiment shown in FIG. 1.

A shutter opening control lever 38 having a hook portion 38a is rotatably mounted on a shaft 39. A permanent magnet 40 is fixed to this shutter opening control lever 38. This permanent magnet 40 is kept to be attracted to the electromagnet 2 whenever the latter is deenergized. A stopper 41 is provided to limit the distance of the clockwise rotation of the shutter opening control lever 38. An operating ring 42 is provided and it has a bent portion 42a which is adapted to engage the hook portion 38a, and said ring 42 is also provided with a shaft 42b. A spring 43 is provided so as to urge the operating ring 42 to rotate clockwise. An operating lever 44 which is provided with arms 44a and 44b is rotatably mounted on the shaft 42b. The arm 44a of this operating lever 44 has a cam portion 44c which is formed therein. A spring 45 is provided so as to urge the operating lever 44 to rotate clockwise. A lever 46 for driving the shutter blades is provided and it has a pin 46a which is adapted to contact the cam portion 44c, and this lever 46 is rotatably mounted on a shaft 47. A spring 48 is provided so as to urge the lever 46 to rotate clockwise. A stopper 49 is provided to limit the distance of the counterclockwise rotation of the lever 46. The lever 46 for driving the shutter blades is constructed in such a fashion that, as it is rotated clockwise from its position illustrated, said lever 46 will open the shutter blades and that, as the lever 46 subsequently returns to the position illustrated, it will close the shutter blades. A shutter closing control lever 50 which is provided with a bent portion 50a and also with a pin 50b adapted to contact the arm 44b of the operating lever 44 is rotatably mounted on a shaft 51. A spring 52 is provided so as to urge the shutter closing control lever 50 to rotate clockwise. The spring 45 is of a force greater than the force of the spring 52.

A release lever 53 which is provided with slots 53a and 53b and also with a stepped portion 53c is pulled upwardly by a spring 56. Reference numerals 54 and 55 represent guide pins, respectively, for the release lever 53. A switch lever 57 is provided with a bent portion 57a and also with a pin 57b, and this switch lever is rotatably mounted on a shaft 58. A spring 59 is provided so as to urge the switch lever 57 to rotate clockwise.

Description will hereunder be made on the function of this third embodiment. FIG. 4 shows the shutter in its cocked state. The release lever 53 may be depressed downwardly against the force of the spring 56. Whereupon, the switch lever 57 will be caused to rotate clockwise by the action of the spring 59 to close the switch SW which is provided in the electronic circuit. It should be understood that, even when the release lever 53 is deprived of the depression force while the shutter is in the aforesaid state, the release lever 53 will not be allowed to return upwardly. Accordingly, the switch SW is retained in its closed state.

When the switch SW is closed, the electromagnet 2 is energized. Whereupon, there is generated a repelling force between the permanent magnet 40 and the electromagnet 2. This repelling force will act in such a way that the shutter opening control lever 38 is rotated clockwise. As a consequence, the hook portion 38a of said lever 38 is relieved of its engagement with the bent portion 42a of the operating ring 42, and this latter ring will be rotated clockwise by the action of the spring 43. Owing to this clockwise rotation of the operating ring 42, the cam portion 44c will be caused to retreat backwardly from its position at the pin 46a of the lever 46 for driving the shutter blades, and accordingly, this lever 46 is rotated clockwise by the action of the spring 48, with the result that the shutter blades are opened.

When the electromagnet 2 is deenergized by the electronic circuit after a lapse of time which is controlled by said circuit, the operating lever 44 will then be quickly rotated clockwise for the reason that the spring 45 is of a force greater than that of the spring 52. During this part of operation, the operating lever 44 pushes the pin 46a by the cam portion 44c of the lever, so that the lever 46 for driving the shutter blades will be rotated counterclockwise, resulting in the closure of the shutter blades. At the same time therewith, the bent portion 50a of the shutter closing control lever 50 pushes the pin 57b of the switch lever 57 owing to the counterclockwise rotation of said control lever 50. As a consequence, the switch lever 57 is rotated counterclockwise against the force of the spring 59. As a result, the switch SW is opened, and in addition, the stepped portion 53c is relieved of its engagement with the bent portion 57a of the switch lever 57, so that the release lever 53 is allowed to return upwardly to its initial position by the action of the spring 56.

Figure 4:
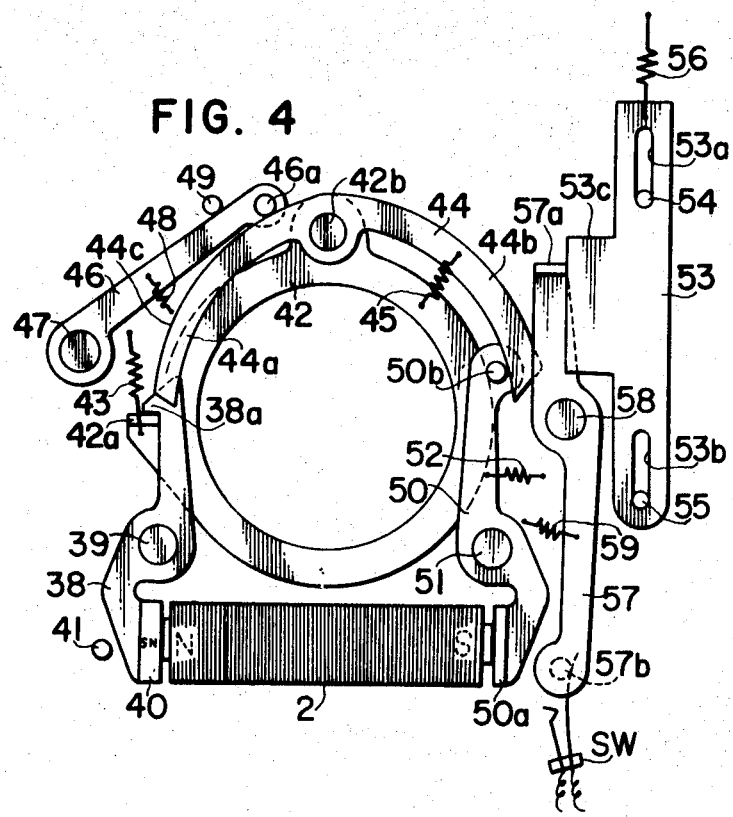

The embodiments shown in FIGS. 1 and 4 have been described as being the shutters of the type that their shutter blades will close after being fully opened. It should be understood, however, that these shutters may be modified into shutters of the type that, by rotating the operating ring 7 or 42 gently, the shutter blades will close before they are fully opened. In other words, it may be possible to obtain a shutter which is capable of controlling both the exposure time and the degree of opening of the exposure aperture by a single set of shutter blades.

The known shutters of this type are designed so as to be operative in such a way that, when the electromagnet is deenergized or energized, the member for closing the shutter blades starts motion always at the maximum opening of the exposure aperture, so that when the opening of the exposure aperture is small in the degree, there lapses a certain length of time from the time at which said member starts motion till the time at which the same actually begins the closing of the shutter blades. Throughout this period, the shutter blades continue their opening movement. This means that the shutter blades are closed, starting at the position of the blades representing a degree of opening of the exposure aperture which is greater than the required opening of the exposure aperture. Thus, there could arise an error in the amount of exposure to light. According to the embodiments shown in FIGS. 1 and 4, however, it will be understood that, when the electromagnet is deenergized, the shutter blades are closed directly from the position assumed by the exposure aperture at such time. Accordingly, there will arise no error in the amount of exposure to light.

I claim:

1. An electronic shutter for photographic cameras having an electromagnet control of its actuation time by an electronic circuit, said shutter comprising first spring means for opening the shutter;

operating means movable from its cocked position by said first spring means for effecting the opening of the shutter;

first control means having a permanent magnet, and disposed adjacent to said electromagnet so as to be attracted thereto by the magnetic force of said permanent magnet for locking said operating means in its cocked position when said electromagnet is in the deenergized state, and to be moved away from said electromagnet by the repelling force generated between said electromagnet and said permanent magnet for releasing said operating means from its cocked position when said electromagnet is energized;

second spring means for closing the shutter; and second control means having a pole-contacting portion, and disposed adjacent to said electromagnet so as to be attracted thereto when said electromagnet is in the energized state, and to be moved away from said electromagnet for effecting the closing of the shutter when said electromagnetic is deenergized.

2. An electronic shutter according to claim 1, in which said operating means comprises an operating ring rotatable about the exposure aperture from its cocked position to its stationary position by said first spring means; and an operating lever having first engaging portion for engaging said second control means, and having second engaging portion for engaging a shutter blade operating member, and pivotably attached to said operating ring for closing the shutter when said electromagnet is deenergized.

3. An electronic shutter according to claim 2, in which said second engaging portion is a stepped portion.

4. An electronic shutter according to claim 2, in which said second engaging portion is a cam portion.

5. An electronic shutter according to claim 2, in which said operating lever is pivotable by said second control means when the electromagnet is deenergized.

6. An electronic shutter according to claim 2 in which said second control means is caused to move away from the electromagnet by said operating lever when the electromagnet is deenergized.

7. An electronic shutter according to claim 2, in which said operating lever is adapted to be pivoted, before the shutter blades are fully opened, in accordance with the deenergization of said electromagnet.

8. An electronic shutter according to claim 1, in which is provided a second operating means movable from its cocked position to its stationary position for effecting the closure of the shutter, and retained in its cocked position by said second control means until the electromagnet is deenergized.

* * * * *